United States Patent
Honda et al.

(10) Patent No.: US 6,794,058 B2
(45) Date of Patent: Sep. 21, 2004

(54) FLIP-CHIP TYPE SEMICONDUCTOR DEVICE

(75) Inventors: Tsuyoshi Honda, Gunma-ken (JP); Tatsuya Kanamaru, Gunma-ken (JP); Eiichi Asano, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 51 days.

(21) Appl. No.: 10/350,110

(22) Filed: Jan. 24, 2003

(65) Prior Publication Data

US 2003/0144382 A1 Jul. 31, 2003

Related U.S. Application Data

(63) Continuation-in-part of application No. 09/949,921, filed on Sep. 12, 2001, now abandoned.

(30) Foreign Application Priority Data

Sep. 12, 2000 (JP) ...................................... 2000-276231

(51) Int. Cl.$^7$ ............................................. H01L 29/12
(52) U.S. Cl. ...................... 428/620; 257/789; 257/793; 257/795; 523/457; 523/458; 523/459; 523/466
(58) Field of Search ............................... 257/789, 793, 257/795; 428/620; 523/457, 458, 459, 466

(56) References Cited

U.S. PATENT DOCUMENTS 5,175,199 A * 12/1992 Asano et al. ................ 523/444

FOREIGN PATENT DOCUMENTS

JP 3-279210 A 12/1991
JP 5-24882 A 2/1993

* cited by examiner

Primary Examiner—Philip Tucker
Assistant Examiner—D. Aylward
(74) Attorney, Agent, or Firm—Birch, Stewart, Kolasch & Birch, LLP

(57) ABSTRACT

A flip-chip type semiconductor device sealed with a light transmissive epoxy resin composition comprising
(A) an epoxy resin having the following general formula (i):

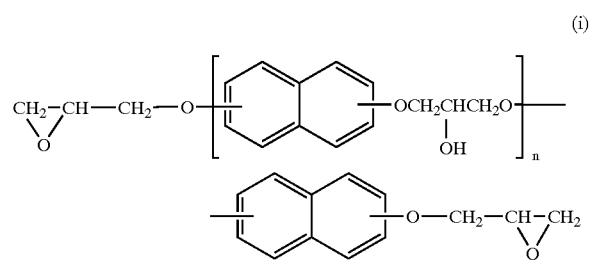

wherein n is 0 or a positive number,
(B) a curing accelerator, and
(C) an amorphous silica-titania co-melt as at least one of inorganic fillers,
said composition satisfying the relationship of the following formula (1):

$$[\{2(n_A^2 + n_C^2) - (n_A + n_C)^2\}/2]^{1/2} < 3.0 \times 10^{-3} \quad (1)$$

wherein $n_A$ is the refractive index at 25° C. of the cured product of the composition excluding the inorganic fillers, and $n_C$ is the refractive index at 25° C. of the inorganic fillers.

2 Claims, 2 Drawing Sheets

FLIP-CHIP TYPE SEMICONDUCTOR DEVICE

This application is a continuation-in-part of application Ser. No. 09/949,921 filed on Sep. 12, 2001, the entire contents of which are hereby incorporated by reference.

This invention relates to flip-chip type semiconductor devices sealed with cured products of epoxy resin compositions of inorganic filler loading type affording the cured products having low stress and high transparency.

BACKGROUND OF THE INVENTION

While the recent advance of the information technology requires effective transmission and processing of a vast quantity of information bits, what is now under investigation as a substitute for conventional signal transmission through electrical wiring is semiconductor devices which take advantage of the high speed, low loss, non-induction and other desirable features of optical signals and mounting technology used therefor. In particular, interest has increased in applications where ultra-high speed, ultra-high density and ultra-low loss are required as in flip-chip type central processing units (CPU).

Most of prior art opto-functional devices are sealed with epoxy resins which are free of inorganic filler in order that the resin layer be transparent. Such unfilled epoxy resins are not satisfactory when the heat resistance, humidity resistance and low stress property of cured parts are taken into account. On the other hand, conventional epoxy resin compositions for semiconductor encapsulation are loaded with finely divided silica as the inorganic filler. Cured products of such filled compositions have good heat resistance, moisture resistance and low stress property, but are opaque because of the difference in refractive index between the cured epoxy resin and the inorganic filler.

U.S. Pat. No. 5,175,199 discloses a light transmission epoxy resin composition comprising (A) a curable epoxy resin,
(B) a curing agent, and
(C) silica-titania glass beads having a linear transmittance of at least 70% as measured at a wavelength in the range of from 900 nm to 600 nm by a linear transmittance measurement method, said method comprising
mixing a bisphenol type epoxy resin of the general formula (1) shown below or a novolak type epoxy resin of the general formula (2) shown below with phenylglycidyl ether to form a solution having a difference in refractive index from the silica-titania glass beads within ±0.002,
mixing the solution with the silica-titania glass beads which have been ground to a mean particle diameter of 5 to 30 μm in a weight ratio of 1:1, and
measuring the linear transmittance of the mixture across a light path length of 1 mm,
wherein formula (1) is (1)

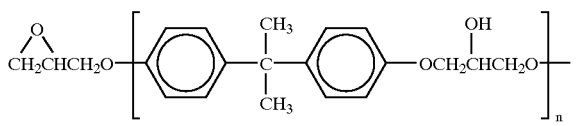

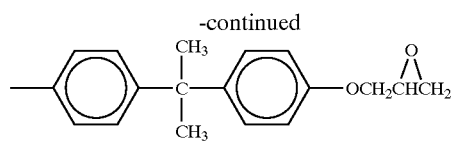

where n is an integer of from 0 to 10, and formula (2) is (2)

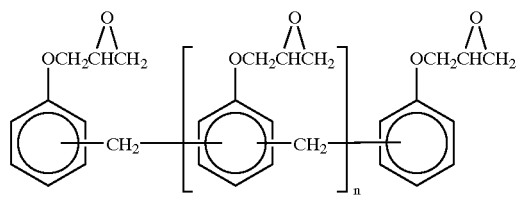

where n is an integer of from 0 to 10.

However, the epoxy resin composition of U.S. Pat. No. 5,175,199 is not so sufficient for the use requiring a low stress as in the case of encapsulating a flip-chip type semiconductor device.

There is a need for an epoxy resin sealant which is transparent despite filler loading and has a lower stress.

SUMMARY OF THE INVENTION

An object of the invention is to provide a flip-chip type semiconductor device sealed with a cured product of a light-transmissive epoxy resin composition of inorganic filler loading type which exhibits high transparency and imparts a lower stress in the cured state.

It has been found that when an epoxy resin composition comprises an epoxy resin of the following general formula (i), a curing accelerator, and an amorphous silica-titania co-melt as an inorganic filler as essential components and satisfies the relationship of the following formula (1), cured products thereof become highly transparent despite the presence of inorganic fillers and impart an improved low stress, thereby providing a flip-chip type semiconductor device for optical communications sealed with the cured product of the epoxy resin compositions.

Accordingly, the invention provides a flip-chip type semiconductor device sealed with a light transmissive epoxy resin composition comprising (A) an epoxy resin having the following general formula (i):

(i)

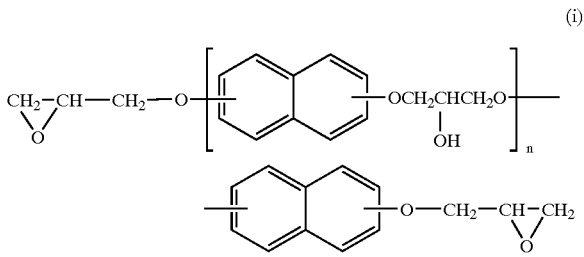

wherein n is 0 or a positive number,
(B) a curing accelerator, and
(C) an amorphous silica-titania co-melt as at least one of inorganic fillers, said composition satisfying the relationship of the following formula (1):

$$[\{2(n_A^2 + n_C^2) - (n_A + n_C)^2\}/2]^{1/2} < 3.0 \times 10^{-3} \quad (1)$$

wherein $n_A$ is the refractive index at 25° C. of the cured product of the composition excluding the inorganic fillers, and $n_C$ is the refractive index at 25° C. of the inorganic fillers.

DESCRIPTION OF THE PREFERRED EMBODIMENTS

Figure 1:
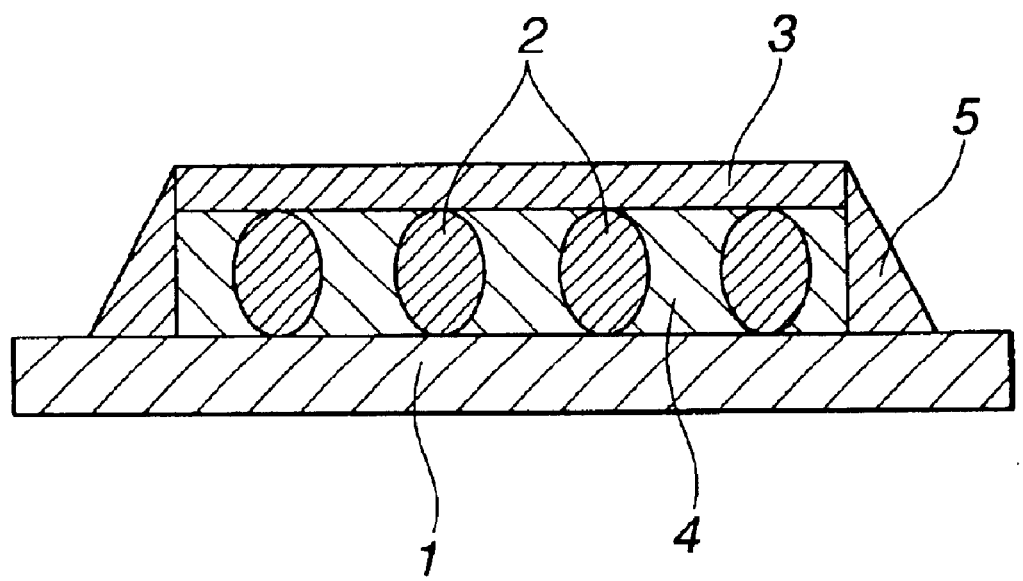
FIG. 1 is a schematic cross-sectional view of a flip-chip type semiconductor device according to one embodiment of the invention.

The light-transmissive epoxy resin composition of the invention includes (A) an epoxy resin, (B) a curing accelerator, and (C) an inorganic filler as essential components and optionally, a curing agent and other components.

The epoxy resin as component (A) is a naphthalene-type epoxy resin represented by the following formula (i):

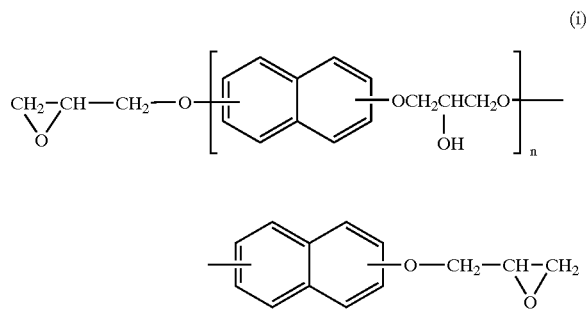

(i)

wherein n is 0 or a positive number, preferably 0 to 5, more preferably 0 to 1.

More preferably, the epoxy resin is one represented by the following formula (ii) or (iii), or the mixture of the epoxy resin of formula (ii) and the epoxy resin of formula (iii).

The naphthalene-type epoxy resin of the above formula (i) has a rigid structure as compared with a bisphenol-type epoxy resin and a novolak-type epoxy resin, and can lower the stress of the interface between the epoxy resin layer and a tip or substrate.

If required, the other epoxy resins may be added so long as the effect of the invention is not injured.

Illustrative examples of suitable epoxy resins other than the naphthalene-type epoxy resins include bisphenol-type epoxy resins such as bisphenol A epoxy resin, bisphenol F epoxy resin and bisphenol S epoxy resin, novolak-type epoxy resins such as phenolic novolak epoxy resin and cresol novolak epoxy resin, triphenolalkane-type epoxy resins such as triphenolmethane epoxy resin and triphenolpropane epoxy resin, phenolaralkyl-type epoxy resins, biphenylaralkyl-type epoxy resins, stilbene-type epoxy resins, biphenyl-type epoxy resins, cyclopentadiene-type epoxy resins, and alicyclic epoxy resins. These epoxy resins may be used singly or as mixtures of two or more thereof.

In this case, the epoxy resin of formula (i) is preferably present in an amount of at least 10% (10 to 100%) by weight, more preferably at least 20% (20 to 100%) by weight, especially at least 50% (50 to 100%) by weight in the total amount of the epoxy resins. If the amount of the epoxy resin of formula (i) is too small, a thermal expansion coefficient of the cured product would become large and a stress would be increased.

The curing accelerator (B) used herein is not critical although it is preferably selected depending on whether or not the curing agent is used or the type of curing agent if used. Where the epoxy resin is cured alone (self-polymerization type epoxy resin), relatively strong basic compounds such as imidazole compounds are desirable. Where the epoxy resin is cured with curing agents such as acid anhydrides or phenolic resins (acid anhydride curing type or phenol curing type epoxy resin), even relatively weak basic compounds such as organophosphorus compounds are employable as well as imidazole compounds. Illustrative examples of suitable imidazole compounds include 2-methylimidazole, 2-ethylimidazole, 4-methylimidazole, 4-ethylimidazole, 2-phenylimidazole, 2-phenyl-4-methylimidazole, 2-phenyl-4-hydroxymethylimidazole, 2-ethyl-4-methylimidazole, 1-cyanoethyl-2-methylimidazole, 2-phenyl-4-methyl-5-hydroxymethylimidazole, and 2-phenyl-4,5-dihydroxymethyl-imidazole. Organophosphorus compounds that may be used herein include triorganophosphines such as triphenylphosphine, tributylphosphine, tri(p-methylphenyl)phosphine, tri(nonylphenyl)phosphine, tri(p-toluyl)phosphine, tri(p-methoxyphenyl)phosphine, tri(p-ethoxyphenyl)phosphine, and triphenylphosphine-triphenylboran; and organophosphines and derivatives

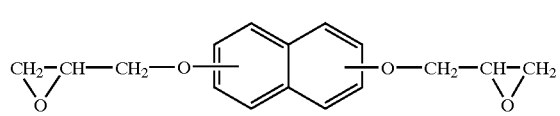

(ii)

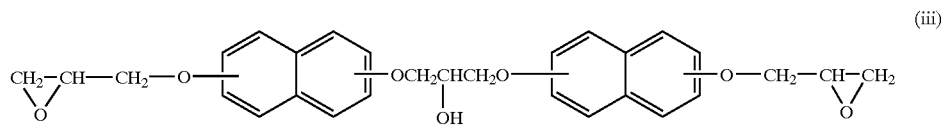

(iii)

thereof, for example, quaternary phosphonium salts such as tetraphenylphosphonium tetraphenylborate. Of these, combinations of acid anhydride curing agents with imidazole compounds or organophosphine compounds are desirable because of the transparency of cured products.

The amount of the curing accelerator added is not critical although an appropriate amount is about 0.1 to 40 parts by weight per 100 parts by weight of the epoxy resin. Particularly when the epoxy resin is cured alone, about 1 to 40 parts by weight of the curing accelerator is used per 100 parts by weight of the epoxy resin. Where curing agents such as acid anhydrides and phenolic resins are used, about 0.1 to 20 parts by weight of the curing accelerator is used per 100 parts by weight of the total amount of the epoxy resins. An amount of the curing accelerator below the range may invite losses of humidity resistance and heat resistance due to undercure. With an amount of the curing accelerator beyond the range, the composition in uncured state may become unstable during storage.

Component (C) is an inorganic filler and contains an amorphous silica-titania co-melt, also known as silica-titania glass. The refractive index of the amorphous silica-titania co-melt is higher than that of silica, and can be adjusted so that the epoxy resin composition can satisfy the formula (1) described later.

The amorphous silica-titania co-melt (i.e., silica-titania glass) may be prepared by a conventional sol-gel process using an alkoxysilane and an alkoxytitanium as starting reactants. Then the refractive index of the inorganic filler can be adjusted in terms of the blending proportion of reactants. An appropriate blending proportion of reactants, that is, alkoxysilane/alkoxytitanium is in the range from 99/1 to 50/50, especially from 90/10 to 70/30 in molar ratio. If the blending proportion of reactants is outside the range, the refractive index of the inorganic filler may largely differ from that of the cured product of the unfilled composition, resulting in the cured product of the filled composition becoming opaque.

The shape and particle size of amorphous silica-titania co-melt are not critical and may be selected in accordance with a particular application. For use as an underfill for flip-chip type semiconductor devices, the preferred co-melt has an irregular shape with no acute corners or spherical shape as well as an average particle size at most about one-tenth as large and a maximum particle size at most one-half as large as the gap between the substrate and chip in a flip-chip semiconductor device. Specifically, the average particle size is usually up to 10 µm, preferably 0.5 to 10 µm, more preferably 1 to 5 µm and the maximum particle size is up to 50 µm, preferably up to 25 µm, and more preferably up to 12 µm. The average particle size may be suitably determined as the weight average value or median diameter, for example, by laser diffraction analysis.

The other inorganic filler may be added so long as the effect of the invention is not injured. Suitable fillers other than the amorphous silica-titania co-melt include crystalline or amorphous silica, talc, mica, silicon nitride, boron nitride and alumina.

The amount of amorphous silica-titania co-melt added is not critical although it is desirable from the requirement of formula (1) for the co-melt to account for 10% to 100% by weight, more preferably 30% to 100% by weight, and most preferably 50% to 100% by weight of all inorganic fillers. If the amount of amorphous silica-titania co-melt added is below the range, cured products may become opaque. The addition amount of all inorganic fillers including the amorphous silica-titania co-melt is preferably about 50 to 1,000 parts, especially about 100 to 500 parts by weight per 100 parts by weight of the total of other components. If the amount of inorganic filler added is below the range, cured products may lose, in part, heat resistance, humidity resistance and low stress property. An excessive amount of inorganic filler may provide an uncured composition with an extremely increased viscosity, compromising the working efficiency.

In the epoxy resin composition of the invention, a curing agent may be added as component (D). Illustrative of the curing agent are acid anhydrides, phenolic resins, and amine compounds, with the acid anhydrides being desirable for the transparency of cured products. The type of the acid anhydride is not critical although preferred acid anhydrides include aliphatic acid anhydrides such as dodecenylsuccinic anhydride, polyadipic anhydride, polyazelaic anhydride and polysebacic anhydride; alicyclic acid anhydrides such as methyltetrahydrophthalic anhydride, methylhexahydrophthalic anhydride, hymic anhydride, hexahydrophthalic anhydride, tetrahydrophthalic anhydride, trialkyltetrahydrophthalic anhydride and methylcyclohexane dicarboxylic anhydride.

The amount of acid anhydride blended is not critical although an appropriate amount is to give an epoxy resin/acid anhydride ratio between 100/50 and 100/200, and especially between 100/80 and 100/125 in equivalent ratio. An amount of the acid anhydride outside the range can sometimes cause undercure, resulting in losses of humidity resistance and heat resistance.

In the epoxy resin composition, other additives such as flame retardants, coupling agents and thermoplastic resins may be blended insofar as they do not compromise the objects of the invention.

When the epoxy resin composition of the invention is prepared, the respective components may be blended in any desired order and mixed in any desired way. For example, a pre-blend of the components is mixed in a two-roll mill, three-roll mill, kneader or mixer of any desired type while heating if desired.

The epoxy resin composition of the invention satisfies the relationship of the formula (1).

$$[\{2(n_A^2 + n_C^2) - (n_A + n_C)^2\}/2]^{1/2} < 3.0 \times 10^{-3} \qquad (1)$$

In formula (1), $n_A$ is the refractive index at 25° C. of the cured product of the composition excluding the inorganic filler, and $n_C$ is the refractive index at 25° C. of the inorganic filler. This formula means that the standard deviation of the refractive index of the cured product of the epoxy resin composition excluding the inorganic filler on the basis of the refractive index of the inorganic filler is less than $3.0 \times 10^{-3}$. For the sake of brevity, the term "filled composition" is used to denote an epoxy resin composition comprising an epoxy resin, a curing accelerator, and an inorganic filler, and "unfilled composition" used to denote an epoxy resin composition comprising an epoxy resin and a curing accelerator, but excluding an inorganic filler.

The measurement of a refractive index is now described. The refractive index $n_A$ is measured by furnishing the unfilled epoxy resin composition, molding and curing the composition under conventional conditions into a sample as shown in FIG. 1, for example, and measuring the refractive index thereof at 25° C. The refractive index $n_C$ of the inorganic filler is measured by dispersing the inorganic filler in a solvent mixture of dimethylsulfoxide ($n_D$=1.4783 at 25° C.) and 1-chloronaphthalene ($n_D$=1.6305 at 25° C.) in a weight ratio of inorganic filler/solvent mixture of 50/50, and determining the refractive index at 25° C. of the solvent mixture at which the dispersion exhibits a light transmittance of at least 99.9% at each wavelength of 1600 nm, 900 nm and 600 nm, that refractive index being regarded as the refractive index of the inorganic filler.

The standard deviation of refractive index given by $[\{2(n_A^2+n_C^2)-(n_A+n_C)^2\}/2]^{1/2}$ is less than $3.0\times10^{-3}$, usually 0 to $2.5\times10^{-3}$, preferably 0 to $2.2\times10^{-3}$, more preferably 0 to $1.5\times10^{-3}$, and most preferably 0 to $0.8\times10^{-3}$. If this value is more than $3.0\times10^{-3}$, the cured product has a reduced light transmittance, compromising the object of the invention.

The components and their amounts are selected so that the epoxy resin composition can satisfy the condition defined by the above formula (1).

The epoxy resin composition is obtained in a solid or liquid state. In the solid state, it is used in the form of granules, tablets or film. In the liquid state, it is used as being filled in a suitable container such as a syringe. The epoxy resin composition is usually cured by heating at a temperature of about 100 to 150° C. for about 1 to 6 hours.

The epoxy resin composition cures into a product having high transparency and improved properties such as heat resistance, humidity resistance and low stress due to the inclusion of inorganic filler. These features make the composition especially suitable as an underfill material for flip-chip type semiconductor devices for optical communications.

Referring to FIG. 1, a flip-chip type semiconductor device according to one embodiment of the invention is illustrated as comprising a substrate 1 having an optical waveguide. An optical semiconductor chip 3 having optical emission device and photodetector is mounted on the substrate via a plurality of bumps 2 to define gaps between the substrate 1 and the optical semiconductor chip 3 and also between the bumps 2. The gaps are filled with an underfill material 4 and sealed along sides thereof with a fillet material 5.

The epoxy resin composition of the invention is use as the underfill material 4 in cured form. The fillet material 5 is formed of an epoxy resin composition comprising an epoxy resin and an inorganic filler as main components in cured form.

EXAMPLE

Examples of the invention and comparative examples are given below by way of illustration, and are not intended to limit the invention.

Examples 1–3 and Comparative Examples 1–3

Epoxy resin compositions were prepared by blending epoxy resins A to C, a curing accelerator (2E4MZ: 2-ethyl-4-methylimidazole), inorganic fillers A to E (amorphous silica-titania co-melt obtained by a sol-gel process) shown in Table 1, and a curing agent (4MTHPA: 4-methyltetrahydrophthalic anhydride) according to the formulation shown in Table 2, followed by intimate mixing.

Figure 2:
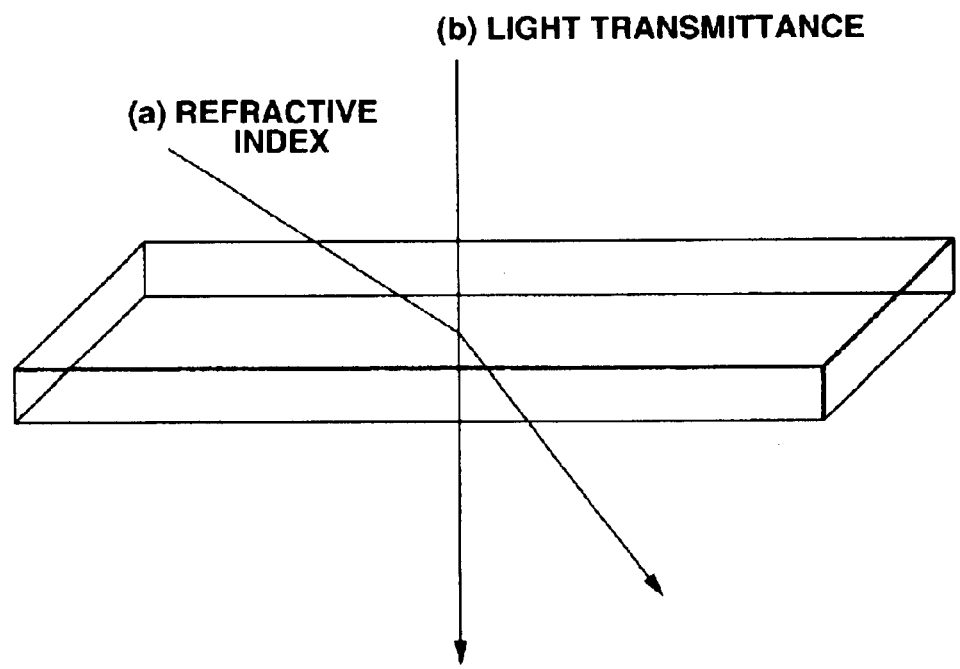
FIG. 2 schematically illustrates the measurement of refractive index and transmittance of a sample.

Each epoxy resin composition was cured under conditions: 100° C./1 hour plus 150° C./4 hours into a test sample of 10 mm×50 mm×0.1 mm (optical path length) as shown in FIG. 2.

Separately, a semiconductor device as shown in FIG. 2 was prepared by coating each epoxy resin composition on a BT substrate 1 as a coating 2 of 10 mm×10 mm×0.1 mm, on which a silicon chip 3 of 10 mm×10 mm×0.3 mm was placed. The composition was cured under conditions: 100° C./1 hour plus 150° C./4 hours, completing the device.

These epoxy resin compositions were examined by the following tests (a) to (d). The results are shown in Table 2.

(a) Refractive Index

For the cured products of unfilled epoxy resin compositions, test samples as shown in FIG. 2 were prepared under the same conditions as used for the cured products of the filled epoxy resin compositions. These samples were measured for refractive index $n_A$. The refractive index $n_C$ of an inorganic filler was measured by dispersing the inorganic filler in a solvent mixture of dimethylsulfoxide ($n_D$=1.4783 at 25° C.) and 1-chloronaphthalene ($n_D$=1.6305 at 25° C.) in a weight ratio of inorganic filler/solvent mixture of 50/50, and determining the refractive index $n_C$ of the solvent mixture when the dispersion exhibited a light transmittance of at least 99.9% at each wavelength of 1600 nm, 900 nm and 600 nm. All measurements were made at 25° C. It is noted that the mixing ratio of solvents in the solvent mixture was not fixed. Instead, a number of solvent mixtures having different mixing ratios were furnished, the inorganic filler was dispersed therein, the dispersed systems were observed for transparency, and the refractive index of the solvent mixture from which a transparent system was obtained was regarded as the refractive index of the inorganic filler.

(b) Light Transmittance

The test sample of FIG. 1 was measured for light transmittance at a wavelength of 1600 nm, 900 nm and 600 nm and 25° C.

(c) Glass Transition Temperature and Linear Expansion Coefficient

A test sample of 5 mm×5 mm×15 mm obtained by curing each epoxy resin composition at 100° C./1 hour plus 150° C./4 hours was measured for glass transition temperature (Tg) and linear expansion coefficient (CTE 1<Tg and CTE 2>Tg) using a thermal mechanical analyzing apparatus (TMA 8140C by RIGAKU).

(d) Solder Crack Resistance After Moisture Absorption

Figure 3:
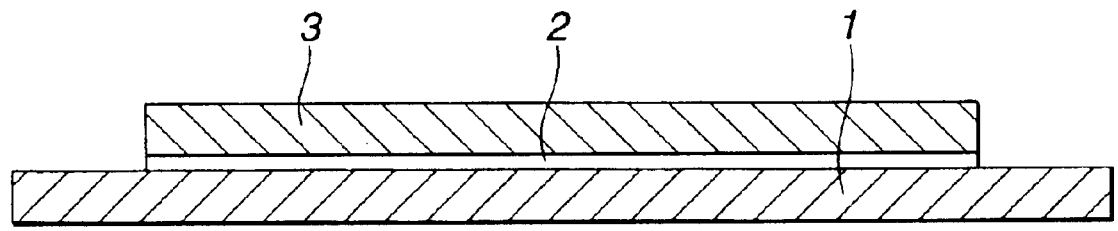
FIG. 3 is a schematic cross-sectional view of a semiconductor device to which an epoxy resin composition is applied.

A semiconductor device as shown in FIG. 3 was allowed to stand for 24 hours in an atmosphere of 121° C., RH 100% and 2 atm. It was immersed for 10 seconds in a solder bath at 240° C. The number of cracked samples per the total number of tested samples is reported.

(e) Thermal Cycling Test

A semiconductor device as shown in FIG. 3 was immersed for 10 seconds in a solder bath at 240° C. and then for 10 seconds in liquid nitrogen. The number of cracked samples after 50 cycles per the total number of tested samples is reported.

Epoxy resin A: epoxy equivalent 141

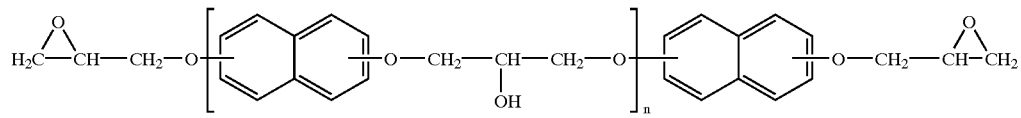

n = 0.046

Epoxy resin B: epoxy equivalent 172

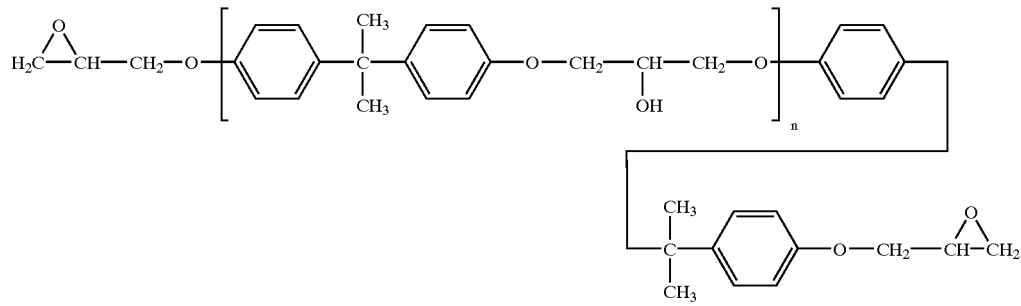

n = 0.014

TABLE 1

|  |  | Blending ratio (mol %) | | Average particle size ($\mu$m) | Maximum particle size ($\mu$m) |
| --- | --- | --- | --- | --- | --- |
|  |  | $SiO_2$ | $TiO_2$ |  |  |
| Inorganic filler | A | 85 | 15 | 4.5 | $\leq 12$ |
|  | B | 86 | 14 | 3.8 | $\leq 12$ |

TABLE 2

| Composition | | Example | | | Comparative Example | | |
| --- | --- | --- | --- | --- | --- | --- | --- |
| (pbw) | | 1 | 2 | 3 | 1 | 2 | 3 |
| Epoxy resin A | | 62.6 | 40.1 | 18.9 | 0 | 62.6 | 0 |
| Epoxy resin B | | 0 | 24.1 | 46.8 | 67.2 | 0 | 67.2 |
| 2E4MZ | | 1 | 1 | 1 | 1 | 1 | 1 |
| Inorganic filler A | | 100 | 0 | 0 | 0 | 0 | 0 |
| Inorganic filler B | | 0 | 100 | 0 | 0 | 0 | 0 |
| Inorganic filler C | | 0 | 0 | 100 | 100 | 100 | 0 |
| 4MTHPA | | 37.4 | 35.8 | 34.3 | 32.8 | 37.4 | 32.8 |
| (a) Refractive index | $n_A$ | 1.545 | 1.541 | 1.538 | 1.535 | 1.545 | 1.535 |
|  | $n_c$ | 1.544 | 1.539 | 1.535 | 1.535 | 1.535 | — |
|  | formula (1) ($\times 10^{-3}$) | 0.707 | 1.414 | 2.121 | 0 | 7.071 | — |
| (b) Transmittance | 1600 nm | 100 | 100 | 100 | 100 | 95 | 100 |
|  | 900 nm | 100 | 100 | 100 | 100 | 80 | 100 |
|  | 600 nm | 100 | 99 | 99 | 100 | 65 | 100 |
| (c) Glass transition temperature | Tg(° C.) | 150 | 145 | 137 | 130 | 148 | 149 |
| Linear expansion coefficient | CTE 1(<Tg) (ppm) | 30 | 32 | 35 | 39 | 48 | 32 |
|  | CTE 2(>Tg) (ppm) | 95 | 102 | 108 | 114 | 160 | 98 |
| (d) Solder crack resistance | | 0/20 | 0/20 | 0/20 | 10/20 | 0/20 | 20/20 |
| (e) Thermal cycling test | | 0/20 | 0/20 | 0/20 | 15/20 | 0/20 | 20/20 |

Note: formula (1): $[\{2(n_A^2 + n_C^2) - (n_A + n_C)^2\}/2]^{1/2}$

There has been described an epoxy resin composition which in the cured state has improved heat resistance, humidity resistance and low stress as well as high transparency. The use of the composition as underfill material for flip-chip type semiconductor devices for optical communications can meet the recently increasing requirements of high speed, low loss and high density.

Japanese Patent Application No. 2000-276231 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A flip-chip type semiconductor device sealed with a light transmissive epoxy resin composition comprising (A) an epoxy resin having the following general formula (i):

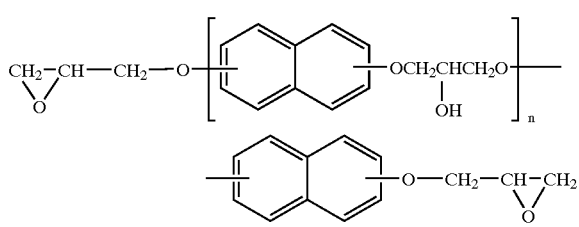

(i)

wherein n is 0 or a positive number, (B) a curing accelerator, and (C) an amorphous silica-titania co-melt, said composition satisfying the relationship of the following formula (1):

$$[\{2(n_A^2 + n_C^2) - (n_A + n_C)^2\}/2]^{1/2} < 3.0 \times 10^{-3} \qquad (1)$$

wherein $n_A$ is the refractive index at 25° C. of the cured product of the composition excluding the inorganic filler, and $n_C$ is the refractive index at 25° C. of the inorganic filler.

2. The epoxy resin composition of claim 1 further comprising (D) an acid anhydride curing agent.

* * * * *